(12) United States Patent
Kim (10) Patent No.: US 9,523,875 B2
(45) Date of Patent: Dec. 20, 2016

(54) METHOD FOR MANUFACTURING CURVED-SURFACE DISPLAY

(75) Inventor: Yong-Beom Kim, Incheon (KR)

(73) Assignee: TOVIS CO., LTD., Incheon (KR)

( * ) Notice: Subject to any disclaimer, the term of this patent is extended or adjusted under 35 U.S.C. 154(b) by 165 days.

(21) Appl. No.: 14/342,785

(22) PCT Filed: Aug. 22, 2012

(86) PCT No.: PCT/KR2012/006665
§ 371 (c)(1),
(2), (4) Date: Mar. 4, 2014

(87) PCT Pub. No.: WO2013/035995
PCT Pub. Date: Mar. 14, 2013

(65) Prior Publication Data
US 2014/0226112 A1 Aug. 14, 2014

(30) Foreign Application Priority Data
Sep. 5, 2011 (KR) .......... 10-2011-0089799

(51) Int. Cl.
*G02F 1/1335* (2006.01)
*G02F 1/1333* (2006.01)

(52) U.S. Cl.
CPC ....... *G02F 1/1333* (2013.01); *G02F 1/133305* (2013.01); *G02F 2001/133331* (2013.01); *G02F 2202/28* (2013.01)

(58) Field of Classification Search
CPC .......... G02F 1/1333; G02F 2001/133331; G02F 2001/133388; G02F 2202/28
USPC .......... 349/96
See application file for complete search history.

(56) References Cited

U.S. PATENT DOCUMENTS

| 6,262,787 B1 * | 7/2001 | Kamoi et al. .......... 349/96 |
| 8,493,535 B2 * | 7/2013 | Enomoto .......... 349/137 |
| 2006/0273304 A1 | 12/2006 | Cok |
| 2008/0006819 A1 | 1/2008 | McCormick et al. |
| 2009/0015747 A1 | 1/2009 | Nishizawa et al. |
| 2009/0183819 A1 | 7/2009 | Matsuhira |
| 2009/0185100 A1 * | 7/2009 | Matsuhira .......... G02B 6/005 349/58 |

(Continued)

FOREIGN PATENT DOCUMENTS

| EP | 2267519 A1 | 12/2010 |
| JP | S63-180831 U | 11/1988 |

(Continued)

*Primary Examiner* — Hoan C Nguyen
(74) *Attorney, Agent, or Firm* — Rabin & Berdo, P.C.

(57) ABSTRACT

A method for manufacturing a curved-surface display having a desired curved shape using a flat display panel having a first substrate and a second substrate includes: paring partially outer surfaces of the first substrate and the second substrate so as to reduce thicknesses thereof to a predetermined thickness; attaching a polarizer on at least one of the pared outer surfaces of the first substrate and the second substrate; and attaching a reinforcing plate having the same shape with the desired curved shape and light transmitting characteristics to the display panel using an adhesive layer which is formed on at least a portion of edge portions of the display panel in a state that the pared flat display panel to which the polarizer is attached is bent to the desired curved shape.

8 Claims, 8 Drawing Sheets

(56) References Cited

U.S. PATENT DOCUMENTS

| | | | |
|---|---|---|---|
| 2010/0171918 A1* | 7/2010 | Saitou et al. | 349/149 |
| 2011/0025621 A1* | 2/2011 | Kawabe | G02F 1/13338 |
| | | | 345/173 |
| 2013/0180653 A1* | 7/2013 | Kim | G02F 1/133305 |
| | | | 156/257 |

FOREIGN PATENT DOCUMENTS

| | | |
|---|---|---|
| JP | 2009-020168 A | 1/2009 |
| JP | 2010-97028 A | 4/2010 |
| JP | 2010-097028 A | 4/2010 |
| JP | 2010-117618 A | 5/2010 |
| KR | 10-0435826 B1 | 8/2004 |
| KR | 10-2005-0085066 A | 8/2005 |
| KR | 10-2011-0030732 A | 3/2011 |

\* cited by examiner

METHOD FOR MANUFACTURING CURVED-SURFACE DISPLAY

CROSS-REFERENCE TO RELATED APPLICATIONS

This Application is a continuation of International Application PCT/KR2012/006665 filed on Aug. 18, 2012, and claims priority to Korean Patent Application No. 10-2011-0089799, filed on Sep. 5, 2011, the contents of both of which are entirely incorporated herein by reference for all purposes.

TECHNICAL FIELD

The present invention relates to a method for manufacturing a curved-surface display for manufacturing a display panel having a curved-surface shape.

BACKGROUND ART

Various display devices have been developed and are being used. A liquid crystal display device which realizes images using liquid crystal is widely used.

Generally, a liquid crystal display (LCD) includes two display panels and a liquid crystal layer disposed therebetween and having a dielectric anisotropy. An electric filed is formed in the liquid crystal layer, and a transmittance of light passing the liquid crystal layer is regulated by regulating amplitude of the electric field so as to obtain a desired image. Such a liquid crystal display is representative one of a flat panel display (FPD), and TFT-LCD which uses thin film transistor (TFT) as a switching element is widely used.

A plurality of display signal lines i.e., gate lines and data lines, a plurality of thin film transistors and pixel electrodes are formed on a lower display panel of the two display panels of the liquid crystal display panel, and a color filter and a common electrode are formed on a upper display panel.

Such a liquid crystal display panel is generally manufactured in a flat shape, so the conventional liquid crystal display panel cannot be used as a curved display.

In order to solve this problem, a flexible liquid crystal display panel which has flexible substrates instead of glass substrates of a conventional liquid crystal display panel so as to be bent by external bending force has been developed.

However, there is a problem that the manufacturing process of the conventional flexible liquid crystal display panel is difficult and the manufacturing cost thereof is high.

DETAILED DESCRIPTION OF THE INVENTION

Technical Problem

The present invention has been made in an effort to provide a curved-surface display panel fabrication method which can produces a display panel having a curved shape through a simple process using a conventional flat display panel.

Technical Solution

In an embodiment of the present invention, a method for manufacturing a curved-surface display having a desired curved shape using a flat display panel having a first substrate and a second substrate includes: paring partially outer surfaces of the first substrate and the second substrate so as to reduce thicknesses thereof to a predetermined thickness; attaching a polarizer on at least one of the pared outer surfaces of the first substrate and the second substrate; and attaching a reinforcing plate having the same shape with the desired curved shape and light transmitting characteristics to the display panel using an adhesive layer which is formed on at least a portion of edge portions of the display panel in a state that the pared flat display panel to which the polarizer is attached is bent to the desired curved shape.

The adhesive layer may be formed along edges of the display panel in a shape of a closed figure.

The method for manufacturing a curved-surface display may further includes forming a dam member which supports an inner surface of the adhesive layer on a surface of the polarizer before after attaching the polarizer before forming the adhesive layer.

In the attaching the polarizer, an optically clear adhesive layer may be formed on at least one of the pared outer surfaces of the first substrate and the second substrate and the polarizer is attached thereon.

In an embodiment of the present invention, a curved-surface display which is formed using a flat display panel having a first substrate and a second substrate includes: the first substrate and the second substrate outer surfaces of which are partially pared and being bent to a desired curved shape; one or two polarizer which is attached to at least one of the pared outer surfaces of the first substrate and the second substrate; and a reinforcing plate which has the same shape with the desired curved shape and light transmitting characteristics, the reinforcing plate being attached to the display panel using an adhesive layer which is formed on at least a portion of edge portions of the display panel in a state that the pared flat display panel to which the polarizer is attached is bent to the desired curved shape.

The curved-surface display may further include a dam member which supports an inner surface of the adhesive layer on a surface of the polarizer.

The polarizer may be attached to the first substrate and the second substrate by an optically clear adhesive layer which is formed on the pared surfaces of the first substrate and the second substrate.

Advantageous Effects

According to the present invention, outer surfaces of the first substrate and the second substrate of a conventional flat display panel are partially removed to reduce the thicknesses thereof and then a polarizer and a reinforcing plate are attached in a state that the display panel is bent to maintain the curved shape, so the curved display panel can be fabricated through simple process.

In addition, by forming a dam member inside the adhesive layer, it can be prevented that the adhesive layer is pressed to flow into an image display area while the reinforcing plate is being attached.

DETAILED DESCRIPTION OF THE EMBODIMENTS

Embodiments of the present invention will now be described hereinafter with reference to the accompanying drawings.

A method for manufacturing a curved-surface display according to the present invention relates to a method which forms a display panel having a desired curved-surface shape using a conventional flat display panel having two substrates facing one another. For example, the display panel having a desired curved-surface shape can be fabricated from a liquid crystal display panel which includes two substrates facing one another and a liquid crystal layer formed therebetween. A method for manufacturing a curved-surface display using a liquid crystal display panel will be explained.

As shown in FIG. 1 to FIG. 8, a method for manufacturing a curved-surface display panel according to an embodiment of the present invention forms a display panel having a desired curved-surface shape using a flat display panel 100a (referring to FIG. 4) having a first substrate 110 and a second substrate 120 facing each other and a liquid crystal layer 130 having liquid crystals aligned in a vertical or parallel direction with respect to the two substrates 110 and 120.

The first substrate 100 may be referred to as a thin film transistor array substrate, and the second substrate 120 may be referred to as a color filter array substrate.

Meanwhile, not shown in the drawing, at edges of the two substrates 110 and 120, a sealant which is made of material for bonding the two substrates 110 and 120 and forms a space which is filled with liquid crystal may be disposed, and the liquid crystal is prevented from being leaked by the sealant.

A method for manufacturing a curved-surface display panel according to an embodiment of the present invention will be explained hereinafter in detail with reference to FIG. 4 to FIG. 8.

A method for manufacturing a curved-surface display panel according to an embodiment of the present invention includes paring partially outer portions of the first substrate 110 and the second substrate 120 respectively so as to reduce thicknesses thereof to predetermined thicknesses. That is, as shown in (a) of FIG. 4, by removing outer surfaces of the first substrate 110 and the second substrate 120 of the conventional flat type liquid crystal display panel 100a, a shape of (b) of FIG. 4 is obtained.

Figure 4:
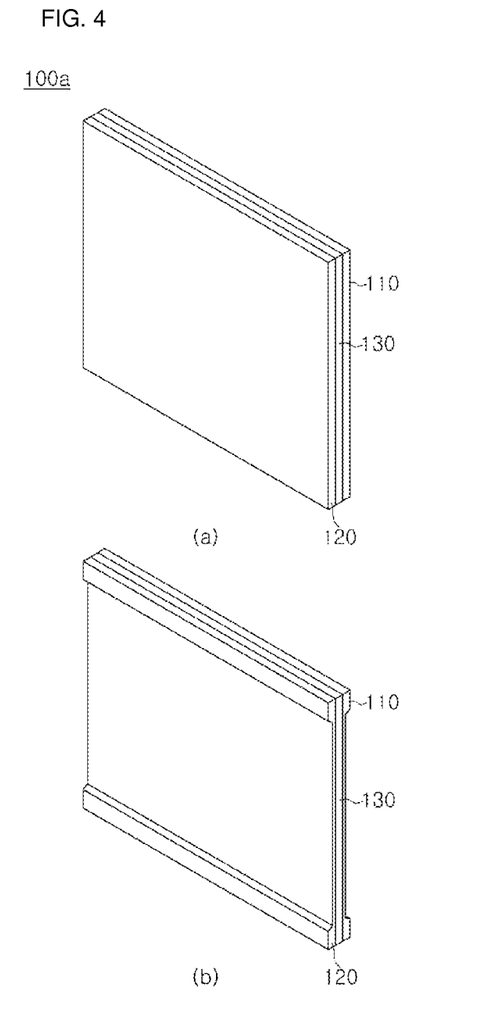
FIG. 4 is a drawing for explaining a process of partially removing outer surfaces a flat display panel in a method for manufacturing a curved-surface display according to an embodiment of the present invention.

At this time, in the step of paring outer portions ((a) to (b) in FIG. 4), a method of paring the first substrate 110 and the second substrate 120 may be any one of methods known in the art. For example, it may be a mechanical polishing method or an etching method using etchant.

When the outer portion of the first substrate 110 and the second substrate 120 are pared, edge portions which are not bent in the desired curved shape may not be removed. That is, as shown in (b) of FIG. 4, the upper and lower portions of the first substrate 110 and the second substrate 120 may be not pared. This may protect the driving circuits such as PCB (Printed Circuit Board) to which a driver for driving the liquid crystal panel and various circuit elements are connected may be connected to the upper and lower edges of the substrates. In addition, not paring the upper and lower edges of the substrates, the upper and lower edge portions may play a role of a guide for members which will be attached in the subsequent processes, and may play a role of enhancing the structural strength of the curved-surface display.

Figure 1:
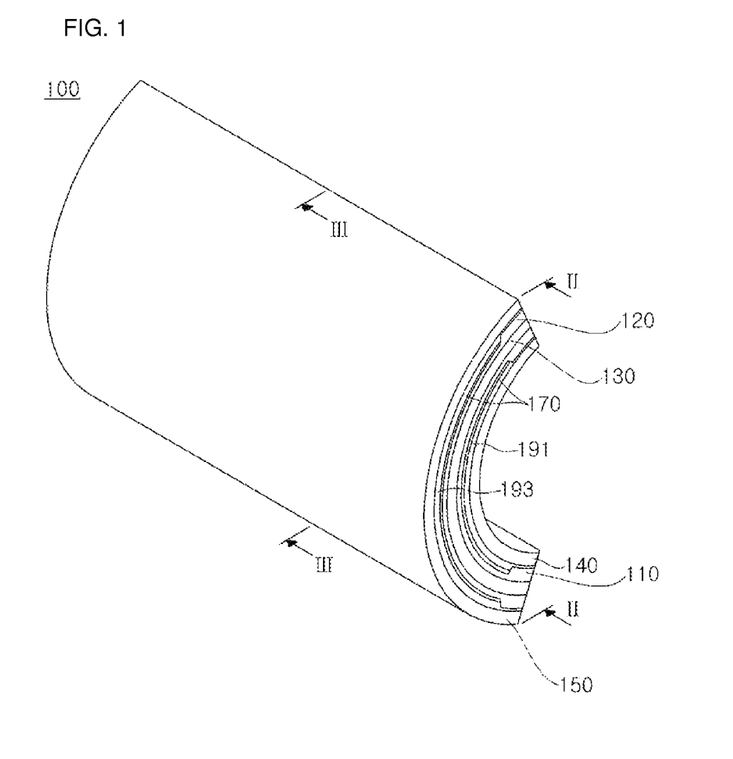
FIG. 1 is a schematic perspective view of a curved display panel formed by a method for manufacturing a curved-surface display according to an embodiment of the present invention.
Figure 2:
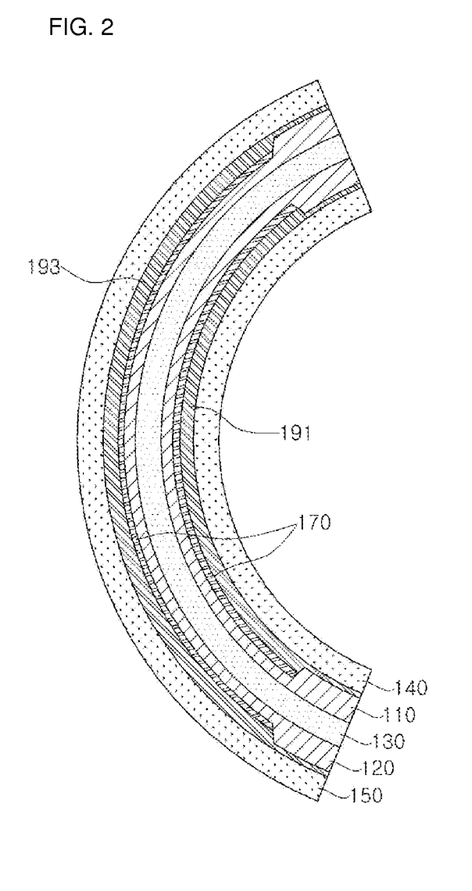
FIG. 2 is a cross sectional view taken along a line II-II in FIG. 1.
Figure 3:
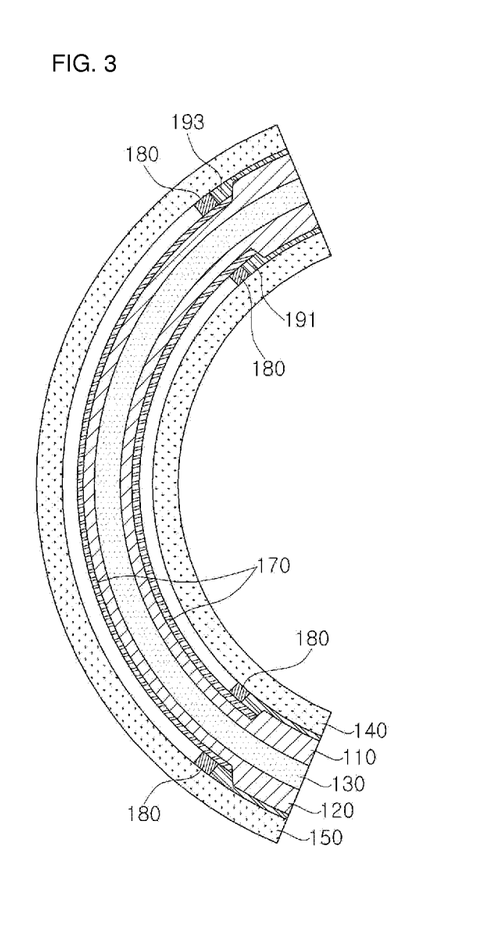
FIG. 3 is a cross sectional view taken along a line III-III in FIG. 1.

The desired curved shape may be a round bracket or a curve shape without an inflection point as shown in FIG. 1 to FIG. 3, and may be an S-shaped curve or a curve shape having one or more inflection points. That is, the desired curved shape may be variously altered.

Further, in the paring step (from (a) to (b) of FIG. 4), the predetermined thickness may be within a range of 50 to 150 μm. If the thicknesses of the first substrate 110 and the second substrate 120 after being pared is less than 50 μm or greater than 150 μm, they may be broken during being bent or may be difficult to be bent. That is, since the thickness of the first substrate 110 and the second substrate 120 after being pared is between 50 to 150 μm, the first substrate 110 and the second substrate 120 can be bent without being broken.

Meanwhile, a method for manufacturing a curved-surface display according to an embodiment of the present invention may include a step of attaching one or more polarizers 170 on at least one of the pared outer surfaces of the first substrate 110 and the second substrate 120. At this time, in a state that the polarizer 170 is bent to a desired curved-surface shape, the display panel is bent and then is attached to the polarizer 170, and in a state that the display panel is bent by attaching an bendable auxiliary film on a side opposite a surface to which the polarizer 170 will be attached, the polarizer 170 can be attached.

Figure 5:
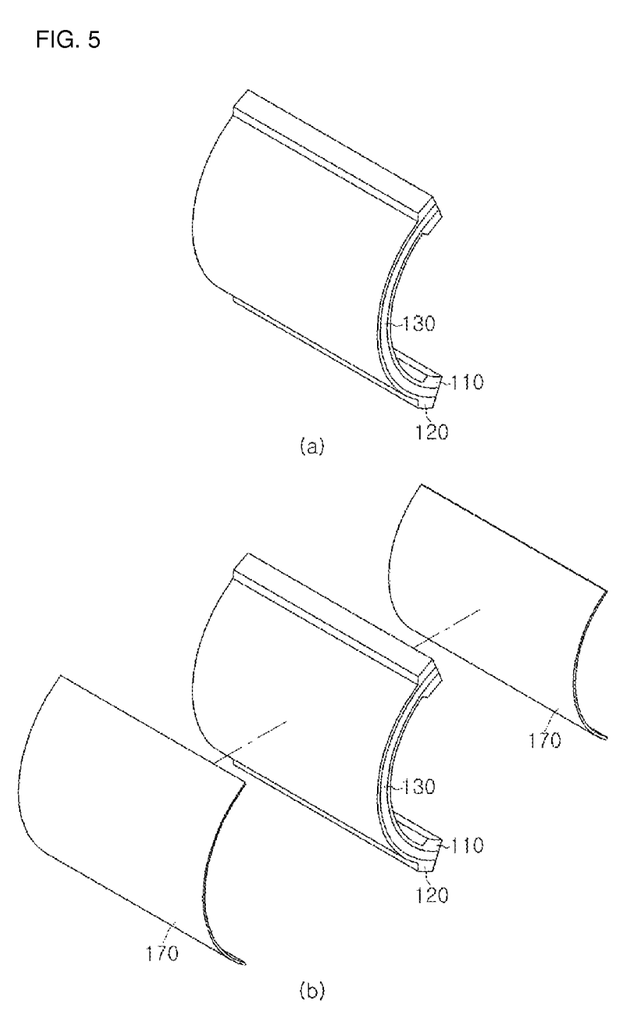
FIG. 5 is a drawing for explaining a process of attaching polarizers at outer surfaces of a display panel in a method for manufacturing a curved-surface display according to an embodiment of the present invention.

As shown in FIG. 2, FIG. 3 and FIG. 5, the polarizer 170 can be attached to the pared outer surfaces of the first substrate 110 and the second substrate 120 respectively, but can be attached to only one of the outer surfaces of the first substrate 110 and the second substrate 120.

Figure 6:
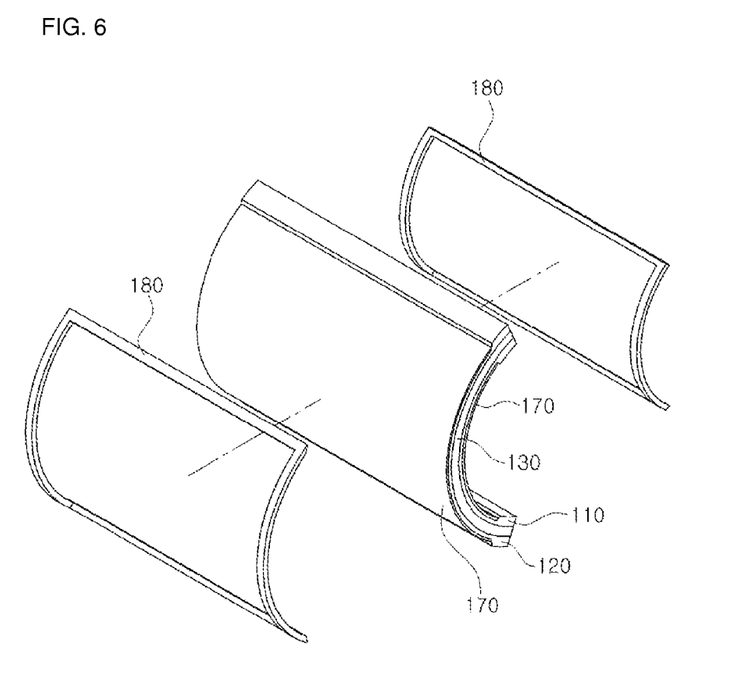
FIG. 6 is a drawing for explaining a process of forming a dam member on outer surfaces of a display panel in a method for manufacturing a curved-surface display according to an embodiment of the present invention.
Figure 7:
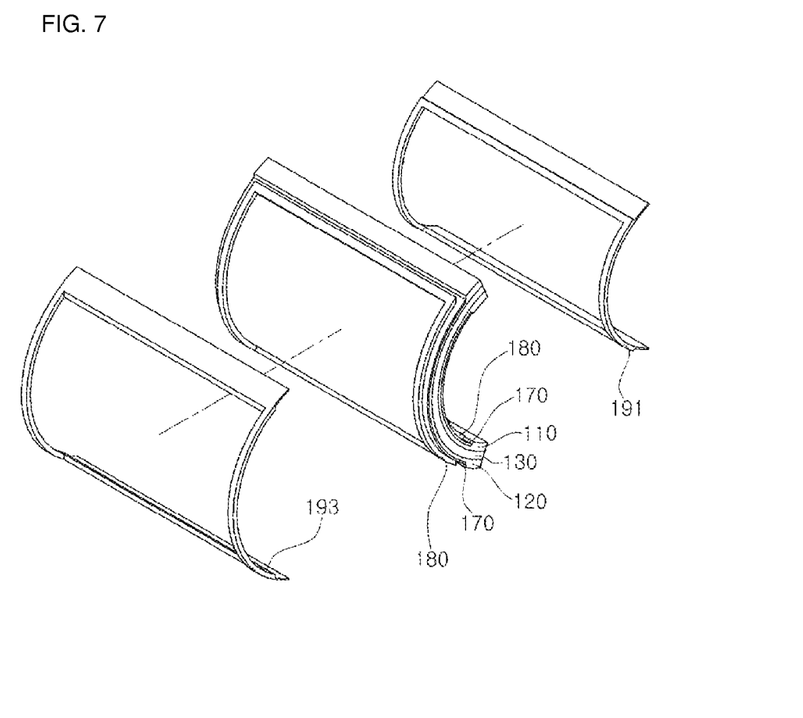
FIG. 7 is a drawing for explaining a process of forming adhesive layers on outer surfaces of a display panel in a method for manufacturing a curved-surface display according to an embodiment of the present invention.

Meanwhile, referring to FIG. 6, a method for manufacturing a curved-surface display according to an embodiment of the present invention may further include forming a dam member 180. The dam member 180 may be formed after attaching the polarizer 170 and before forming adhesive layers 191 and 193 which will be described later. The dam member 180 may be formed on the surface of the polarizer 170 at a position of capable of supporting an inner surface of the adhesive layers 191 and 193. At this time, the dam member 180 may be formed with a predetermined width along an inner portion of an edge of a display panel so as not to invade an image display area of the display panel.

For example, the dam member 180 may be formed with a double-sided adhesive tape or a material such as silicon.

The dam member 180 may be formed with a closed figure of a rectangular ring shape, or may be formed with a combination of several parts so as to have a partially open shape.

In addition, a method for manufacturing a curved-surface display panel according to an embodiment of the present invention includes attaching reinforcing plates 140 and 150 with light transparent characteristics having the same shape with the desired curved surface to the display panel 100a using adhesive layers 191 and 193 which are formed at least on a portion of the edge areas of the display panel 100a. At this time, although the adhesive layers 191 and 193 and the reinforcing plates 140 and 150 are provided respectively on both outer surfaces of the first substrate 110 and the second substrate 120, the adhesive layers 191 and 193 and the reinforcing plates 140 and 150 may be provided on only one of the outer surfaces of the first substrate 110 and the second substrate 120. For example, the adhesive layer and the reinforcing plate may be provided only on a front surface of the second substrate 120 which is closer to a person who sees a display screen among the first substrate 110 and the second substrate 120.

For example, referring to FIG. 6, the adhesive layers 191 and 193 may be formed in a closed figure (e.g., a rectangular loop shape in the drawing) along edges of the pared outer surfaces of the first substrate 110 and the second substrate 120. In more detail, as shown in FIG. 6, the adhesive layers 191 and 193 may be formed in a closed figure having a dam shape with a predetermined width and thickness along edges of the pared portions among the outer surfaces of the first substrate 110 and the second substrate 120. For example, the adhesive layers 191 and 193 may be formed with OCA (optically clear adhesive), ultraviolet-curable resin, resin which is curable under room temperature, or the like.

At this time, referring to FIG. 1 to FIG. 3, the adhesive layers 191 and 193 may have a shape which starts from pared portion of the outer surface of the first substrate 110 the second substrate 120 and covers the non-pared portions. Meanwhile, in another embodiment, the adhesive layers 191 and 193 may be formed only on the pared portion of the outer surface of the first substrate 110 the second substrate 120 and may have the same height with the non-pared portion or to be slightly higher than the non-pared portion, so the reinforcing plates 140 and 150 can be attached in a state of contacting the adhesive layers 191 and 193.

Figure 8:
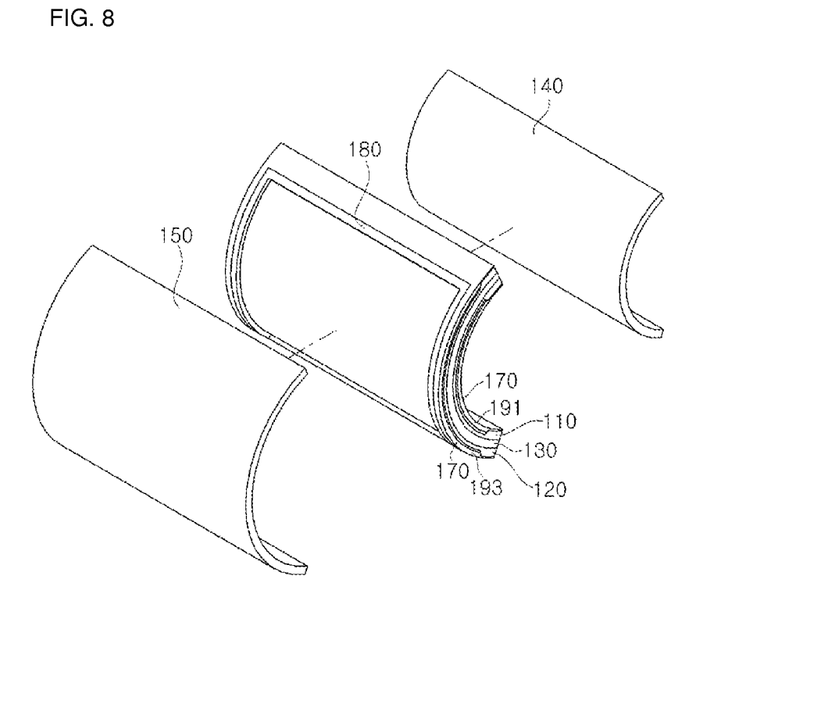
FIG. 8 is a drawing for explaining a process of attaching reinforcing plates on outer surfaces of a display panel in a method for manufacturing a curved-surface display according to an embodiment of the present invention.

Further, referring to FIG. 8, the reinforcing plates 140 and 150 can be adhered to the adhesive layers 191 and 193 which are formed along edges of the outer surfaces of the first substrate 110 and the second substrate in a state that the display panel 100a is bent in a desired curved surface, so as to be attached to the display panel.

Meanwhile, although the adhesive layers 191 and 193 are formed outside the dam member 180 in the drawing, the dam member 180 can be omitted and the adhesive layers 191 and 193 may be directly formed.

The reinforcing plates 140 and 150 may be formed of material having a good light transmitting characteristics, for example materials such as glass or PMMA (PolyMethly MethAcrylate). At this time, the reinforcing plates 140 and 150 may have the same curved shape with the desired curved shape of the curved-surface display panel, and may have strength to maintain the curved shape. As such, after paring outer surfaces of the conventional flat liquid crystal display panel to be flexible and bending the same in a desired curve shape, by attaching the reinforcing plates 140 and 150 having the same curve shape onto the outer surfaces of the bent liquid crystal panel 100a, the curved-surface display panel having the desired curved shape can be formed. Meanwhile, the polarizer 170 which is attached to the display panel may provide a force to maintain the curved state.

At this time, the reinforcing plates 140 and 150 may be attached to the display panel 100a by the adhesive layers 191 and 193 in a state of being spaced from the pared outer surfaces of the first substrate 110 and the second substrate 120. That is, referring to FIG. 3, empty spaces are formed between the reinforcing plates 140 and 150 and the pared outer surfaces of the first substrate 110 and the second substrate 120 so as to form an air gap therebetween. With the existence of the air gap therebetween, the weight of the curved-surface display panel can be reduced and further a shock absorbing effect to protect the first substrate 110 and the second substrate 120 from external shock can be obtained.

Meanwhile, not shown in the drawing, an anti-reflective coating may be formed on an outer surface of the reinforcing plate 150 to improve the display characteristics.

Figure 9:
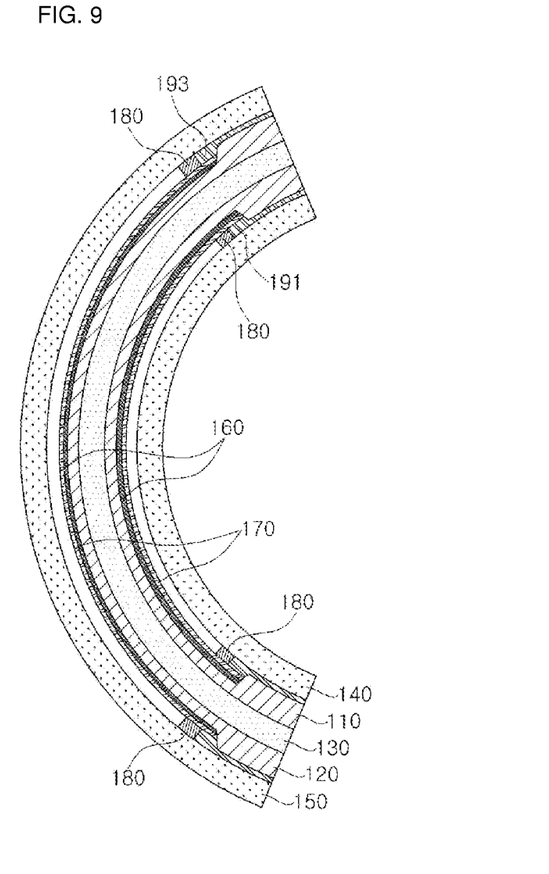
FIG. 9 is a drawing for explaining a method for manufacturing a curved-surface display according to another embodiment of the present invention.

Meanwhile, referring to FIG. 9, according to another embodiment of the present invention, an optically clear adhesive (OCA) layer 160 may be formed on at least one of the pared outer surfaces of the first substrate 110 and the second substrate 120, and the polarizer 170 may be formed thereon. Accordingly, an overall strength of the curved-surface display can be enhanced and optical characteristics can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a display manufacturing method and can be applied to a manufacturing method of display panels, so that present invention has an industrial applicability.

The invention claimed is:
1. A method of manufacturing a curved-surface display panel having a curved shape using a flat display panel having a first substrate and a second substrate, the method comprising:
partially paring portions of outer surfaces of the first substrate and the second substrate, which are to be bent to form the curved shape, so as to reduce a thicknesses thereof to a predetermined thickness and thereby to form a pared panel, wherein in the paring
first edge portions of the outer surfaces of the first substrate and the second substrate, which are not to be bent to form the curved shape, are not pared, and
second edge portions of the outer surfaces of the first substrate and the second substrate, which are to be bent to form the curved shape, are pared;
bending the first substrate and the second substrate such that the second edge portions are bent while the first edge portions are not bent;
attaching a polarizer on at least one of the pared outer surfaces of the first substrate and the second substrate;
forming a dam member on a surface of the polarizer, the dam member having an outer side surface and an inner side surface; and forming an adhesive layer along the outer side surface of the dam member, such that inner ends of the adhesive layer are supported by and in contact with the outer side surface of the dam member;

attaching a reinforcing plate, having the curved shape and light transmission characteristics, to the first edge portions by the adhesive layer such that the reinforcing plate is spaced apart from the polarizer.

2. The method of manufacturing the curved-surface display of claim 1, wherein the forming of the adhesive layer comprises forming the adhesive layer along the first and second edge portions in a closed figure shape.

3. The method of manufacturing the curved-surface display of claim 1, wherein the attaching the polarizer comprises forming an optically clear adhesive layer on at least one of the pared outer surfaces of the first substrate and the second substrate such that the polarizer is attached thereon.

4. The method of manufacturing the curved-surface display of claim 1, wherein the dam member is formed before the adhesive layer.

5. A curved-surface display panel, comprising:
   a first substrate and a second substrate, the first substrate and the second substrate having outer surfaces partially pared and bent to a curved shape, wherein
      first edge portions of the outer surfaces of the first substrate and the second substrate, which are not bent, are not pared, and
      second edge portions of the outer surfaces of the first substrate and the second substrate, which are bent to form the curved shape, are pared;
   a polarizer attached to at least one of the pared outer surfaces of the first substrate and the second substrate;
   a dam member disposed on a surface of the polarizer, the dam member having an outer side surface and an inner side surface;
   an adhesive layer disposed on along the outer side surface of the dam member, such that inner ends of the adhesive layer are supported by and in contact with the outer side surface of the dam member; and
   a reinforcing plate having the curved shape and light transmission characteristics, the reinforcing plate being attached to the first edge portions by the adhesive layer such that the reinforcing plate is spaced apart from the polarizer.

6. The curved-surface display of claim 5, further comprising:
   an optically clear adhesive layer disposed on at least one of the pared surfaces of the first substrate and the second substrate, the polarizer being attached to the optically clear adhesive layer.

7. The curved-surface display of claim 5, wherein the adhesive layer comprises a different material than the dam member.

8. The curved-surface display of claim 5, wherein a first portion of the adhesive layer is sandwiched between the first edge portions and the reinforcing plate, and
   a second portion of the adhesive layer is sandwiched between the polarizer and the reinforcing plate.

* * * * *